United States Patent [19]

Gordon

[11] 4,391,707
[45] * Jul. 5, 1983

[54] FLOATING, SURFACE LIQUIDS RETRIEVAL SYSTEM

[75] Inventor: Ellison T. Gordon, Covington, La.

[73] Assignee: Zollco International, Inc., Covington, La.

[*] Notice: The portion of the term of this patent subsequent to Apr. 1, 1997, has been disclaimed.

[21] Appl. No.: 135,642

[22] Filed: Mar. 31, 1980

Related U.S. Application Data

[63] Continuation-in-part of Ser. No. 905,383, May 12, 1978, Pat. No. 4,196,087.

[51] Int. Cl.³ .............................................. E02B 15/04
[52] U.S. Cl. .................................... 210/242.3; 210/923
[58] Field of Search ................. 210/83, 242, DIG. 25, 210/242.3, 923, 521; 440/48

[56] References Cited

U.S. PATENT DOCUMENTS

| | | | |
|---|---|---|---|
| 2,320,451 | 6/1943 | Akins | 440/48 |
| 2,636,467 | 4/1953 | Johnson | 440/48 |
| 3,070,061 | 12/1962 | Rightmyer | 440/48 |
| 3,426,721 | 2/1969 | Justinien | 440/48 |
| 3,623,609 | 11/1971 | Ainlay | 210/242.3 |
| 3,850,131 | 11/1974 | Jones | 440/48 |
| 3,905,902 | 9/1975 | Hoeberg | 210/242 |
| 3,966,614 | 6/1976 | Ayers | 210/DIG. 25 |
| 4,006,082 | 2/1977 | Irons | 210/242.3 |
| 4,011,158 | 3/1977 | Cak | 210/DIG. 25 |
| 4,151,081 | 4/1979 | Bolli et al. | 210/DIG. 25 |
| 4,196,087 | 4/1980 | Gordon | 210/DIG. 25 |

Primary Examiner—Peter A. Hruskoci
Attorney, Agent, or Firm—C. Emmett Pugh & Associates

[57] ABSTRACT

A floating retriever for retrieving, for example, spilled oil or other liquid substances on the top of water having a central liquid collection chamber with a vacuum or suction pick-up for delivery of the pollutants to, for example, a mother vessel which controls the retriever by means of, for example, a boom structure. The retriever has a large surrounding circular float with intake ports with rotational, wiper/configured, laterally disposed vaned cylinders to bring the retrieved liquid to the collection chamber. The device includes an inverted-dome, variable level, water well for stability, as well as radially positioned, selectively controlled, out-rigger, floating screws which may turn clockwise or counterclockwise for both drawing the oil to the intake ports and providing for propulsion and guidance. In an alternate embodiment, an initial, gravity oil/water separator is included in the retriever in association with the central collection chamber.

10 Claims, 5 Drawing Figures

4,391,707

FLOATING, SURFACE LIQUIDS RETRIEVAL SYSTEM

CROSS REFERENCE TO RELATED PATENT APPLICATION

This application is a continuation-in-part of Ser. No. 905,383, filed May 12, 1978 entitled "Floating, Surface Liquids Retrieval System," and being issued as U.S. Pat. No. 4,196,087 on Apr. 1, 1980, the full and complete disclosure of which is incorporated herein by reference.

BACKGROUND OF THE INVENTION

1. Field of Invention

This invention relates to a pick-up system having method and structural aspects for collecting liquids, such as for example, spilled oil, from the surface of bodies of water.

2. Prior Art

Various types of retriever devices have been employed in the past to separate and collect pollutants from the surface of water. Such apparati have, in general, been unable to perform efficiently in wave conditions due to inherent design flaws and a lack of stability in open waters. These devices generally are also unable to collect the surface liquid in an efficient concentrated form, often gathering large amounts of water at the same time. In addition, the prior art, as a whole, does not operate over a great enough area to practically handle very large oil and chemical spills.

GENERAL DISCUSSION OF INVENTION

The present invention overcomes the aforementioned difficulties in the collection of liquid surface pollutants in fresh or salt water.

In the preferred embodiment a central liquid collecting chamber is surrounded by a large circular float with triangular shaped intake ports in the float to allow the retrieved liquid to reach the collecting chamber. This design allows for most of the weight of the apparatus and added ballast to be centrally located, increasing stability. The design also allows for a variable water level to further help in maintaining stability.

The retriever itself can be built in any size from several feet to fifty feet or greater in diameter. A large retriever would be more stable in ocean use and would also be able to handle large chemical or oil spills efficiently.

An inverted-dome water well is included in the retriever underneath the collecting chamber to add stability in wave conditions. The invention allows for varying the water level to assist in maintaining stability. The fluid level is varied by means of an external line by which fluid can be added or withdrawn as is needed for stability. Radially disposed, floating screw drives mounted on shafts pull the oil in some distance from large surrounding areas towards the retriever. These buoyant screw drives also function as outriggers to add further stability in wave conditions. If desired, these screw drives can be operated independently of each other and their rotational speed varied by the shipboard operator. Increasing the turning revolutions of a screw drive would increase the flow rate of the surface liquid into the skimmer and, also, by selectively varying the various screw-drives, provide the retriever with motive power.

Vaned rotors or wipers, laterally disposed across the intake ports of the retriever, are angled to force the surface liquid towards the center of the ports and up the inclined bottoms of the ports. The inclined surface of the ports keeps most of the heavier liquid, water, from entering the central collecting chamber.

The surface liquid is then drawn from the collecting chamber into a storage tank mounted on the mother vessel by use of a vacuum line. The vacuum line is mounted at a set level at least near the top of the collecting chamber so as to only remove the surface liquid in the chamber. This dual system of separation involving the inclined surface of the collection ports and the vacuum line is very effective in recovering a high concentration of surface liquid even under abnormal wave conditions.

Alternatively, a gravity-type separator can be included around and integrated with the central collection chamber to further enhance the purity of the surface liquid being removed.

Further inherent advantages of and improvements achieved by the present invention will become more readily apparent upon consideration of the following, more detailed description and by reference to the appended drawings.

BRIEF DESCRIPTION OF THE DRAWINGS

For a further understanding of the nature and objects of the present invention, reference should be made to the following detailed description, taking in conjunction with the accompanying drawings, in which like parts are given like reference numerals and wherein.

DETAILED DESCRIPTION OF THE PREFERRED EMBODIMENT

Figure 1:
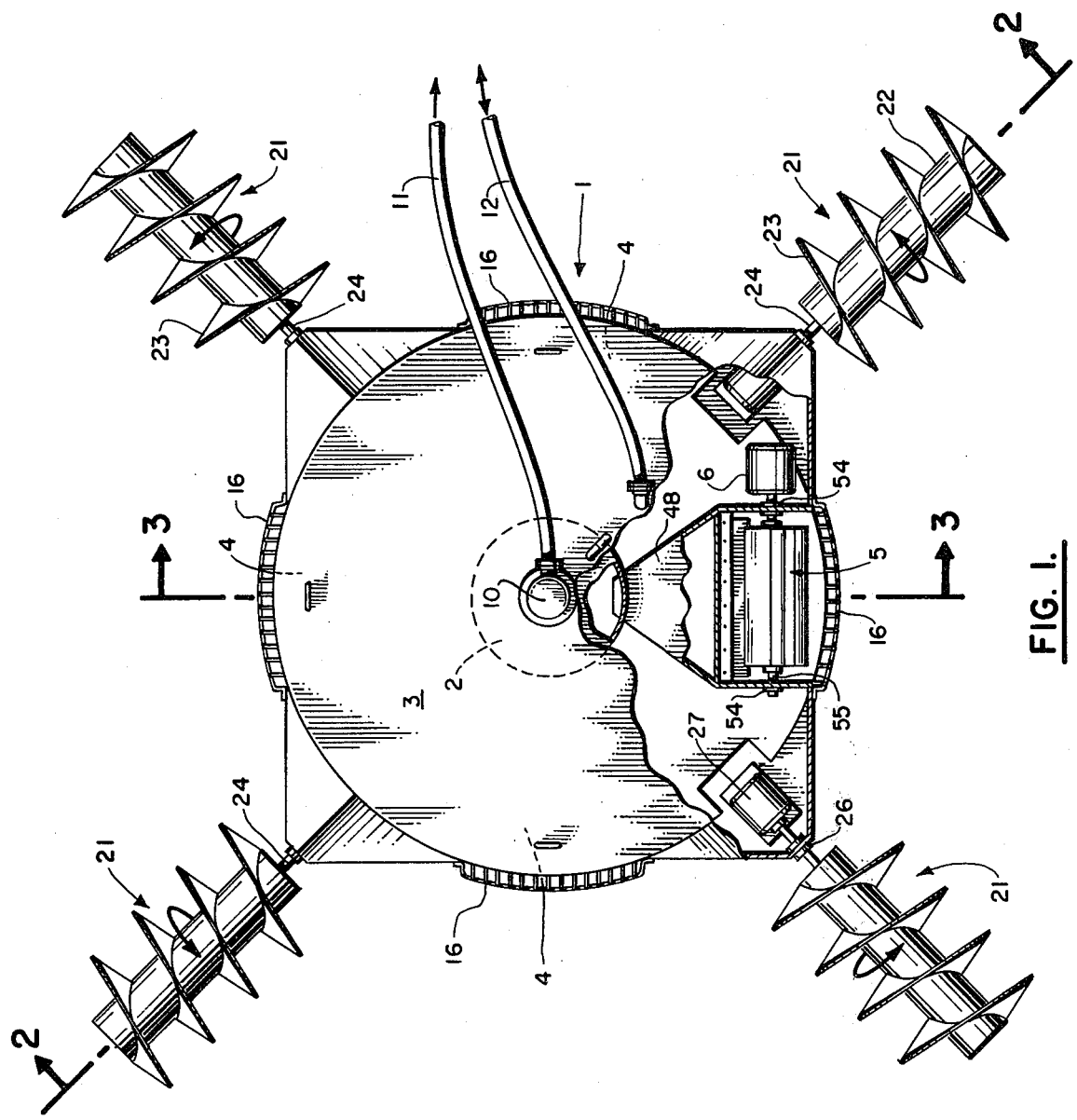
FIG. 1 is a plan view of the preferred embodiment of the apparatus of the present invention with a top portion of the housing cut away to expose the details of an intake port.

Referring to the drawings, the preferred embodiment of the retriever 1 illustrated in FIG. 1 comprises a central liquid collecting chamber 2 surrounded by a circular float 3, the two forming the basic body of the retriever 1, which has a generally circular configuration in horizontal cross-section. Semi-triangular, equally spaced intake ports 4 are located in the float 3 to allow the oil or other surface liquid and debris (if desired) to reach the collecting chamber 2. Grates or screens 16 can be provided if desired at the intake ports 4 to keep out any unwanted debris. Screw drive assemblies 21 with screw vanes 23 mounted around buoyant cylinders 22 are radially and equidistantly disposed as outriggers around the retriever 1 and extend away therefrom a substantial distance of the order of a number of feet for example twenty-five feet.

In this embodiment, four intake ports 4 are arranged radially about the retriever 1. The wiper/configured vaned assembly 5, which forms a lateral, driven member, in each intake port 4 propels the surface liquids towards the middle of the port 4. The liquid flows over the inclined plane 7 (see FIG. 4) which serves to initially separate the liquid floating on the water, and is driven forward by the vaned cylinder 5 and is forced into the liquid collecting tank 2.

Figure 2:
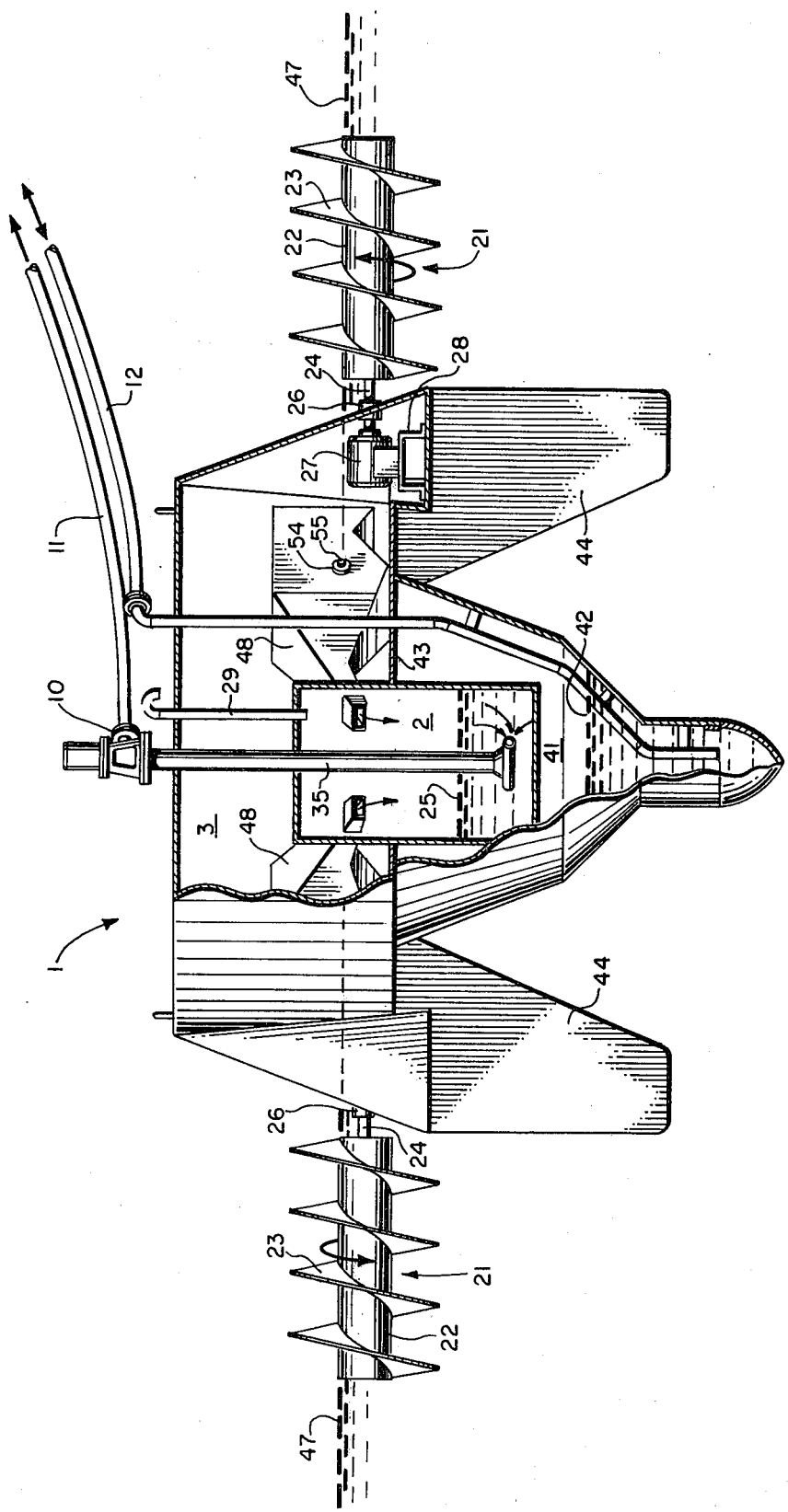
FIG. 2 is a side view of the embodiment of FIG. 1 with a side portion of the housing and center section cut away to expose the intake port sub-housing and the central collection chamber (note perspective lines 2—2 of FIG. 1).

With reference to FIG. 2, a vacuum line 11 enters the top of the collecting chamber 2 through a water tight connector 10 which is attached to a vacuum needle 35. The needle 35 is positioned at or at least near the top of the liquid surface 25 in the collecting chamber 2 in order to draw off the surface liquids. The vacuum line 11, the fluid line 12, and the electrical control lines (unillustrated) are run in a bundle from the retriever 1 to the "mother" vessel (unillustrated) as is known to those skilled in the art and shown in the parent case hereof (U.S. Pat. No. 4,196,087) whose disclosure is incorporated herein by reference.

An inverted-dome-like, fluid well 41 is located at the bottom of the retriever 1 below the water line as best shown in FIG. 2. The level of the fluid 42, such as water or a weighted liquid such as zinc bromide, in the well 41 is controlled via line 12 which either adds or siphons off fluid in order to provide stability to retriever 1 as wave conditions make it necessary. The level of the fluid 42 may be allowed to be as high as the top 43 of the fluid well 41 is order to provide maximum stability in heavy seas. For sea conditions that are between calm and heavy, the fluid level 42 in the well 41 and hence the water line or floating level of the retriever and the intake levels of the ports 4 also will be varied to suit conditions as is necessary for the maximum retrieval of oil or other surface liquids and debris (if desired). Rudder shaped fins 44 are employed to aid in stability and aid in direction control, in particular, when selective use of the screw drive assemblies 21 is employed. Fins 44 are to be formed of sufficient length as to allow sufficient penetration of the water surface in order to achieves maximum control under all wave conditions. The fluid well 41 is thus very useful in providing additional stability to the retriever 1, as well as the rudder fins 44.

Figure 3:
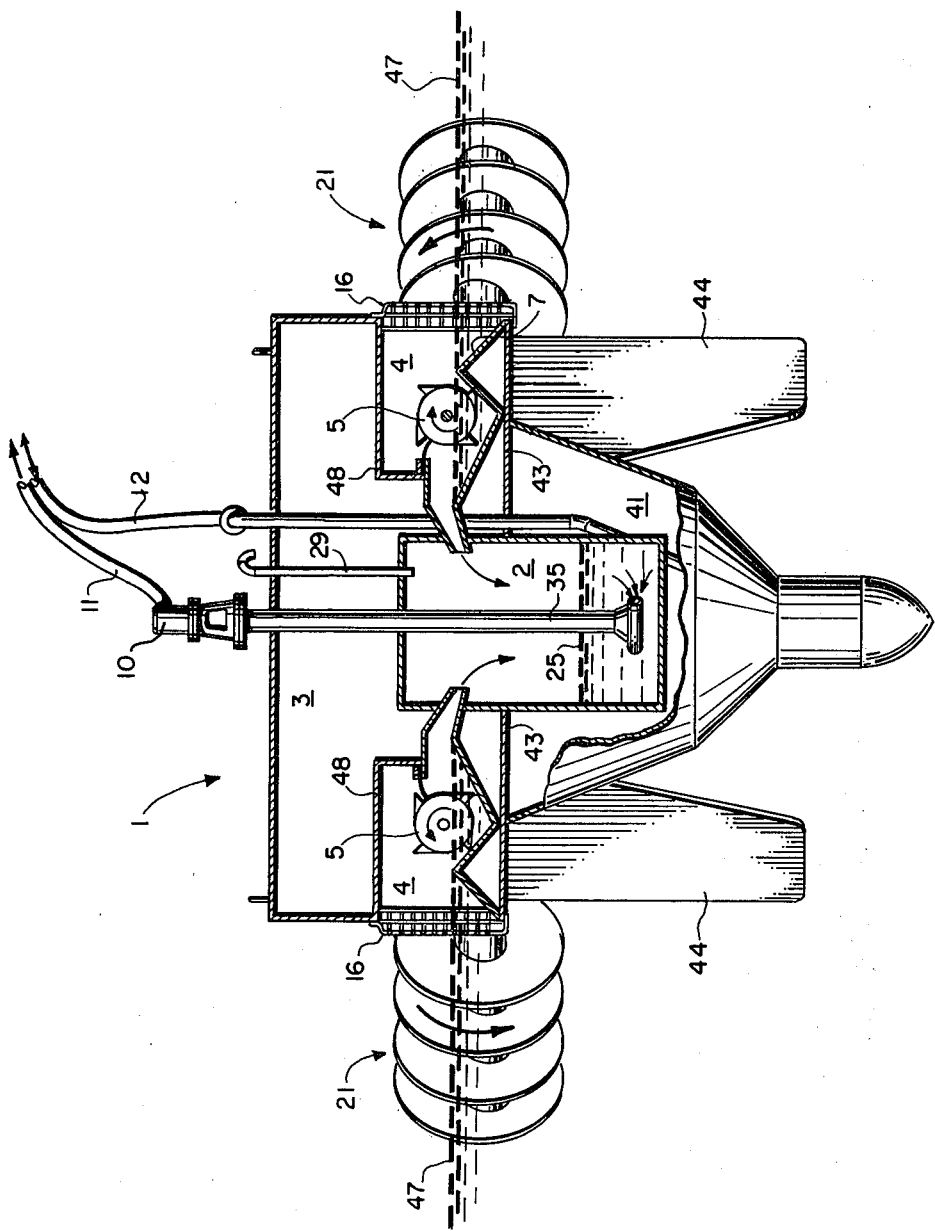
FIG. 3 is a further side view (taken along section lines 3—3 of FIG. 1) of the embodiment of FIG. 1 with a side portion of the housing and central section cut away.
Figure 4:
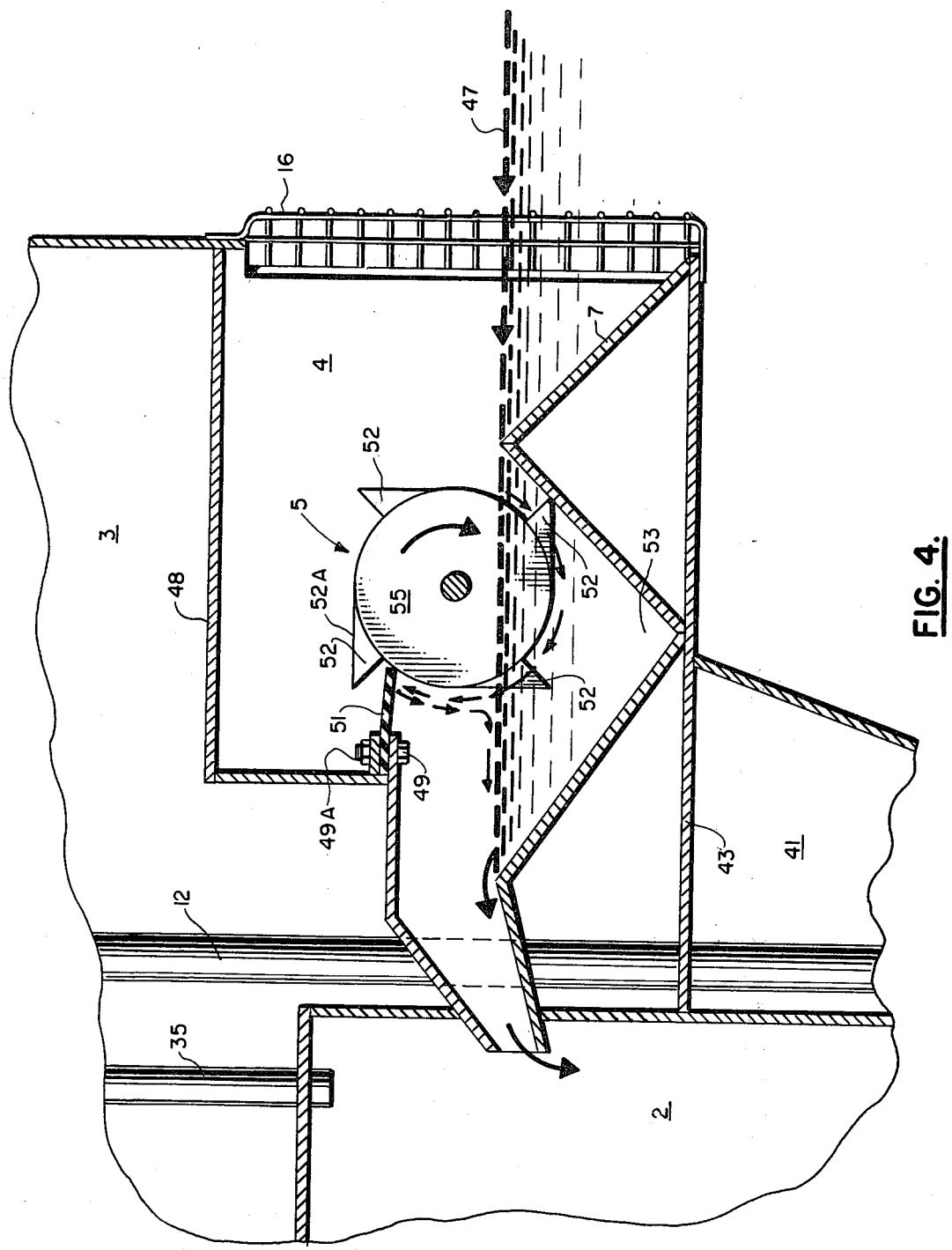
FIG. 4 is a partial, side, cross-sectional view illustrating the separation of liquids by the wiper/configured vaned cylinder at one of the intake ports of the embodiment of FIG. 1.

As generally illustrated in FIG. 3 and FIG. 4, the wiper/configured vaned assembly 5 draws the oil 47 into the intake port 4 (note directional arrows in FIG. 3 and FIG. 4). The wipers 52 of cylinder assemblies 5 are angled to force the surface liquid 47 towards the middle collection bin and inclined surface 7. A motor 6 (note FIG. 1) turns the shaft 55 of the cylinder assembly 5 through waterproof bearings 54. The motor 6 can be operated at varying revolutions to control the amount of the surface liquid on the inclined surface 7.

In specific, FIG. 4 shows a close-up detail of a collection port 4 in which a separate wiper 51 is used to assist in preventing the recirculating of the oil or other liquid by wiping the vane surfaces 52A as the cylinder assembly 5 turns. This assists in speeding up the recovery of the liquid. The wiper 51 extend toward the vaned assembly 5 and is attached to the collection port body 48 by a multiplicity of such means as bolts 49 and nut 49A.

The upper surface of the inclined bottom 7 can include ridges or steps to further aid in the separation of liquids. Triangular-shaped, initial collection troughs 53 serve to temporarily hold the skimmed oil which is coming into the intake port 4 and being driven into the collecting chamber 2. The directional arrows of FIG. 4 show the movement of the liquid as it is skimmed off and is moving to the collection chamber 2. The lateral, driven, vaned assembly 5 is located in the trough with its vanes passing preferably at least very close to within a few inches if not in direct contact with the side wall on the intake side of the trough 53 (note vane 52 in contact at its tip with the trough wall in FIG. 4). A drain line, unillustrated, may be added to allow excess water to drain from the collection trough 53 to the fluid well 41 from which the excess fluids may be withdrawn by line 12.

The system of separation provided by the inclined bottom 7 and the vacuum line 11 results in a high concentration of collected surface liquid. The resulting greater efficiency saves collection time and storage capacity. In addition, the collected surface liquids can be recycled easily with relatively little trouble.

Figure 3A:
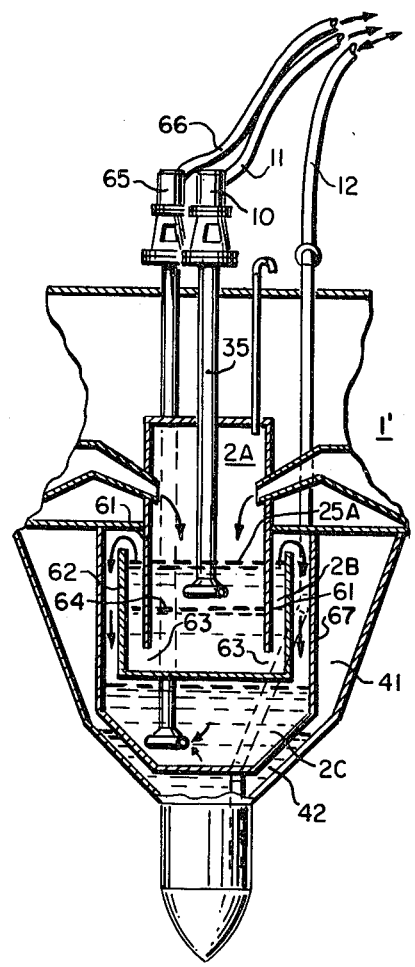
FIG. 3A is a partial, side view of the housing and center section of an alternate embodiment.

Further separation of the surface liquid (e.g. oil) and water can be obtained within the central collection system if so desired by means of the alternate embodiment illustrated in FIG. 3A. In the alternate embodiment of FIG. 3A, the retriever 1' is substantially as described before, with the exception that a gravity separator has been integrated into the central collection area. As shown in FIG. 3A, the collected surface liquid first falls into a combined separator and collection chamber 2A which includes a vacuum pick up line system 35, 10 and 11 (as described above). As the collected fluid builds up, the collected fluid with the highest water content flows through bottom openings 63 in inner cylindrical wall into a surrounding chamber formed by outer cylindrical wall 62. As the liquid builds up in the outer chamber 2B formed by wall 62, it overflows into the second collecting chamber 2C formed by wall 67 from which the fluid is picked-up as desired by supplemental vacuum pick-up 64 which is connected through liquid tight fitting 65 to exit line 66. (The fluid flow is further indicated by direction arrows in FIG. 3A). The other elements having identical reference numbers to elements of retriever 1 of FIG. 3 operate in the same manner as their analogous counterparts.

The buoyant screw drive assembly 21 featured in FIG. 2 is one of several screw assemlies 21 radially disposed around the retriever 1. The screw drive assembly 21 is mounted onto the body of the retriever 1 by use of a connecting lock nut (not illustrated), although a direct method of connection may also be used (as illustrated). A motor 27 placed on a motor mount 28 turns the shaft 24 of the assembly 21 through a waterproof bearing 26.

The vanes 23 are angled so that the assemblies 21 will gather surface liquids from over a large area (for example one hundred and fifty feet) and propel them towards the retriever 1. The screw assemblies can be designed to have sufficient pull to create their own current and move the surface liquids "against the grain," that is against the natural currents of the body of water. The ability to selectively use in combination with the rudder fins 44, or separately vary the speed of the screw assemblies 21 on any side of the retriever 1 provides a self-contained propulsion and guidance system. A further aim of the device is provided for be reversing the motor 27 thereby allowing clockwise and counterclockwise turning of assembly 21 not only for retrieval of the oil but to greatly enhance the self-contained propulsion and guidance system. Thus, motive power is furnished by the assemblies 21 along with directional guidance of the rudder fins 44 in addition to enhancing stability in rough seas as well as their primary purpose of the assemblies 21, the gathering of surface liquids.

It is possible of course to use just one such screw assembly 21 for propulsion and guidance, particularly if its angular position in the horizontal plane can be varied and controlled. Alternatively at least three are desired, or four as illustrated spaced at ninety degrees to one another. Thus in the preferred embodiment of the present invention the screw assemblies 21 are separately and independently controllable both in direction of rotation (clockwise or counterclockwise) and in the speed of rotation.

Besides propulsion and guidance, such controls also allow selective use of the intake ports 4. Thus, if there is oil to be retrieved on only one side of the retriever 1, the two back assemblies 21 can be used to push the retriever into the oil, while the front two assemblies 21 can be used to pull the oil into the intake port 4 between them. If desired, the assemblies 21 could be mounted directly in line with the intake ports 4 rather than at the four "corners," or alternatively only three such assemblies could be used and still allow for complete guidance and propulsion in any direction within all three hundred and sixty degrees.

As shown in FIG. 2, the vacuum pick-up needle 35 extends down into the liquid collecting chamber 2 which also serves as a reservoir having an exemplary capacity of twenty-five to thirty gallons. It is estimated that such a pick-up system should be able to handle a capacity of fifty to seventy-five gallons of oil or fluid per minute, or even greater.

It is also to be understood that the present invention, as disclosed herein, may or may not make use of the other devices and designs as disclosed in the parent case (U. S. Pat. No. 4,196,087), and, in instances where so warranted and previously explained in the prior disclosure, further explanations are thereby it is believed unwarranted in this disclosure.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A buoyant apparatus for collecting liquids floating on the surface of water, comprising:
   a. a basic body having an internal liquid collecting chamber having flotation means associated therewith for providing flotation to said body;
   b. at least three intake port located adjacent to and in communication with said collecting chamber arranged to allow for the passage of the liquid from the exterior to said collecting chamber said intake ports being positioned and spaced at least generally equally about the periphery of said basic body;
   c. at least three floating screw means connected to said basic body and extending radially out there from a number of feet for pulling the surface liquids to said intake port inwardly from a distance many feet away from said basic body, said floating screw means being likewise positioned and spaced at least generally equally about the periphery of said basic body, each said floating screw means having independently operable drive means for independently and controllably rotating said screw means to propel and guide the direction of travel of said basic body across the water surface;
   d. gravity separator means integrally combined with said collecting chamber for further separating the floating liquids and the water; and
   e. liquid pick-up means in said collecting chamber including pumping means for pumping up the liquids for pick-up and ultimate removal of the liquids from the water.

2. The apparatus of claim 1, wherein said intake ports include inclined surface means having an inclined bottom rising toward said collecting chamber for producing some initial separation between the surface liquids and the water.

3. The apparatus of claim 1 wherein there is further included lateral, driven means at said intake port, said driven means comprising a rotatable shaft located laterally across the entry area of said port, said shaft carrying liquid driving vanes for rotation therewith, said lateral, driven means being located inboard of the initial entry of said intake port.

4. The apparatus of claim 3, wherein there is further included a wiper mounted on said basic body extending toward said lateral, driven means and contacting in wiping engagement said vanes on said lateral, driven means.

5. The apparatus of claim 3, wherein there is further included a laterally extending trough in which said lateral, driven means is located, said vanes on said lateral, driven means passing at least very close within a few inches to the intake side of said trough.

6. The apparatus of claim 1 further comprising—
an inverted-dome-like structure located at the bottom of said basic body below its water line, said inverted-dome-like structure being at least generally closed and containing a weighting liquid whose amount can be controllably varied to raise and lower the water line of said basic body.

7. The apparatus of claim 1 wherein there is further included a separate "mother" vessel with boom means connected to said basic body for controlling and operating it.

8. The apparatus of claim 1 wherein said main body is at least generally circular in horizontal configuration and wherein said liquid collecting chamber and said gravity separator are centrally located within said main body.

9. The apparatus of claim 1 wherein said combined collection chamber and said gravity separator means comprise a series of at least three, generally circular, concentric chambers, the two inner ones being connected for fluid communication at their bottom areas and the outer two being in fluid communication by means of the center one over-flowing into the outer one.

10. A buoyant apparatus for collecting liquids floating on the surface of water, comprising:
a main buoyant body which is at least generally circular in horizontal configuration;
a liquid collecting chamber located centrally within said main body;
at least three liquid intake ports in said body located equidistant around the periphery of said body; and
at least three, radially disposed, buoyant, independently drivable, screw drive means capable of both clockwise and counter-clockwise rotation and extending horizontally out exteriorly away from said main body, the screw vanes of which screw drive means protrude above the water line when in use, for driving the liquids inwardly to said intake ports, and for propulsion and guidance of said main body as desired by selectively and independently varying the direction and speed of rotation of the individual ones of said screw drive means.

* * * * *